(12) United States Patent
Farinas et al.

(10) Patent No.: US 12,270,706 B2
(45) Date of Patent: *Apr. 8, 2025

(54) CAVITY ENHANCED ABSORPTION SPECTROSCOPY USING A PIECEWISE TUNABLE LASER AND HIERARCHICAL WAVELENGTH DETERMINATION

(71) Applicant: Picarro, Inc., Santa Clara, CA (US)

(72) Inventors: Alejandro Dario Farinas, Mountain View, CA (US); John A. Hoffnagle, San Jose, CA (US); Chris W. Rella, Sunnyvale, CA (US); Sze Meng Tan, Santa Clara, CA (US)

(73) Assignee: Picarro, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,571

(22) Filed: Aug. 15, 2021

(65) Prior Publication Data

US 2021/0372855 A1 Dec. 2, 2021

Related U.S. Application Data

(63) Continuation of application No. 16/714,518, filed on Dec. 13, 2019, now Pat. No. 11,092,493.

(51) Int. Cl.
*G01J 3/433* (2006.01)
*G01N 21/39* (2006.01)

(52) U.S. Cl.
CPC ............ *G01J 3/4338* (2013.01); *G01N 21/39* (2013.01)

(58) Field of Classification Search
CPC .. G01J 3/4338; G01J 3/23; G01J 3/42; G01N 21/31; G01N 21/39; G01N 21/3504
See application file for complete search history.

(56) References Cited

U.S. PATENT DOCUMENTS

| 6,839,364 | B1 * | 1/2005 | Broutin | H01S 5/06256 372/38.07 |
|---|---|---|---|---|
| 9,267,880 | B1 * | 2/2016 | Tan | G01J 3/00 |
| 2005/0185681 | A1 * | 8/2005 | Ilchenko | H01S 5/146 372/20 |
| 2005/0254056 | A1 * | 11/2005 | Kachanov | G01J 3/42 356/437 |
| 2007/0216903 | A1 * | 9/2007 | Cole | G01J 3/42 356/437 |
| 2009/0200472 | A1 * | 8/2009 | Gregory | G01N 21/3581 250/341.7 |

(Continued)

OTHER PUBLICATIONS

Michael C. Larson et al, "High performance widely-tunable SG-DBR lasers," Proc. SPIE 4995, Novel In-Plane Semiconductor Lasers II, (Jul. 3, 2003) (Year: 2003).*

(Continued)

*Primary Examiner* — Uzma Alam
*Assistant Examiner* — Jonathon Cook
(74) *Attorney, Agent, or Firm* — LUMEN PATENT FIRM

(57) ABSTRACT

Improved cavity enhanced absorption spectroscopy is provided using a piecewise tunable laser by using a lookup table for laser tuning that is configured specifically for this application. In preferred embodiments this is done in combination with a laser control strategy that provides precise wavelength determination using cavity modes of the instrument as a reference.

5 Claims, 4 Drawing Sheets

(56) References Cited

U.S. PATENT DOCUMENTS

2012/0242997 A1* 9/2012 He .......................... G01J 3/28
356/402

OTHER PUBLICATIONS

Joseph T. Hodges, Howard P. Layer, William W. Miller, and Gregory E. Scace, "Frequency-stabilized single-mode cavity ring-down apparatus for high-resolution absorption spectroscopy", Review of Scientific Instruments 75, 849-863 (2004) (Year: 2004).*

* cited by examiner

CAVITY ENHANCED ABSORPTION SPECTROSCOPY USING A PIECEWISE TUNABLE LASER AND HIERARCHICAL WAVELENGTH DETERMINATION

CROSS REFERENCE TO RELATED APPLICATIONS

This application is a continuation of U.S. patent application Ser. No. 16/714,518, filed on Dec. 13, 2019, and hereby incorporated by reference in its entirety.

FIELD OF THE INVENTION

This invention relates to optical spectroscopy.

BACKGROUND

Every compound has a unique and specific absorption spectrum, that we will refer to as a model function. A model function is a data array having pairs of wavelength and optical absorbance data, collected on a pure sample of the compound, or a dilute sample in an inert and non-absorptive balance gas, at a specific temperature and pressure. In gas phase absorption spectroscopy, a source of light is directed through a gaseous medium, and the absorption of the material is measured as a function of optical wavelength (in nm) or frequency (in $cm^{-1}$). These terms will be used interchangeably. This absorption spectrum of an unknown gas sample can be analyzed using standard curve fitting, pattern recognition, and/or component analysis techniques using a predetermined library of model functions to determine the concentration of one or compounds present in the gas sample.

There are a variety of methods for determining the composition of a gas sample from analysis of the optical absorption spectrum. Here, we will focus on a specific category of techniques for measuring trace concentrations of compounds in a gas sample, called Cavity Enhanced Absorption Spectroscopy (CEAS). A variety of methods fall into this category, including Integrated Cavity Output Spectroscopy (ICOS) and Cavity Ring Down Spectroscopy (CRDS), among others.

CEAS techniques employ an optical cavity having two or more highly reflective mirrors (>99.99%) to trap light in a confined space, allowing for very long optical path lengths (1-100 km) in very small flow cells (10-1000 $cm^3$). The long optical path length allows for highly precise measurements of small sample absorption; the small flow cell volume means that the instrument can be compact, and that small quantities of gas can be analyzed. The optical train is designed to cover the required tuning range needed for analysis.

CEAS techniques can be used with both narrowband light sources or broadband light sources. We further restrict the discussion to narrowband light sources, like lasers.

In designing an CEAS based analyzer for a given target compound, a laser wavelength is selected where the absorption of the target compound is strong, and where this absorption can be distinguished spectroscopically from the absorption of other compounds in the gas sample. This last requirement is the reason why an absorption spectrum (including measurements of absorption at multiple spectral points) is used in typical CEAS implementations, rather than absorption measured at a single wavelength (e.g., at the peak absorption of the target compound). The ability to distinguish a target compound and other compounds spectroscopically means in a mathematical sense that the model function of the target analyte cannot be expressed as a linear combination of the model functions of other compounds in the sample. In a qualitative sense, this means selecting a spectral scanning range for which the target analyte has a distinct spectral feature (which necessarily includes a variety of both higher and lower absorption regions); quantitatively, this selection can be made on the basis of an estimate of measurement precision, which itself is derived from the spectral scanning range and density of wavelength points, and the model functions of each of the compounds in the set. In the discussion below, for simplicity, we will use the qualitative description of the scanning range as one that covers a "distinct spectral feature," but in practice, the qualitative optimization of the scanning range is what should be implemented.

Given these considerations, it is an advantage if the CEAS spectrometer possesses the following spectral characteristics:

1) Narrow linewidth light source: The linewidth of the light source in a CEAS system should be substantially smaller than the narrowest spectral feature of any compound in the sample, to simplify the analysis of the resulting spectrum.
2) Spectral tuning range: The tuning range of the optical frequency of the laser should cover the target compound's distinct spectral feature.
3) Spectral tuning agility: The ability to tune the laser across the spectral range, with sufficient tuning speed to achieve a useful density of wavelength points across the range in a practical period of time (typically, <10 seconds).
4) Wavelength determination: A means of determining the laser wavelength with a degree of precision and accuracy that is substantially smaller than the narrowest spectral feature of any compound in the sample.

For spectral linewidth and wavelength determination, it is important to consider a practical example of what "substantially smaller than the narrowest spectral feature" means. If we take as an example an isolated carbon dioxide or water vapor line at sub-atmospheric pressure, the full width at half maximum of the absorption line is about 0.04 $cm^{-1}$. Faithfully recording the spectrum of such an absorption line typically requires that the linewidth and the wavelength determination be at minimum better than $1/10^{th}$ the linewidth, or 0.004 $cm^{-1}$. For strong absorption lines, the derivative of the absorption with wavelength can be large enough to require an even tighter wavelength tolerance of 0.0001 $cm^{-1}$ or better.

We next consider the implications of these requirements on two potential CEAS designs. In the first design, we consider an analyzer to measure the concentration of carbon dioxide in ambient air. In the second design, we consider an analyzer to measure benzene in ambient air.

Carbon dioxide is a simple molecule for which there are many well-isolated ro-vibrational molecular transitions, which create distinct absorption lines. Each line has a distinct center frequency (determined by the structure of the molecule) and a spectral extent of about 0.1-0.2 $cm^{-1}$. Line selection is made by selecting the strongest absorption line that is spectrally isolated from the absorption lines from other common compounds in the ambient air, such as methane and water vapor. Once the line is selected, the CEAS optical train can be designed. Most importantly, one must select a laser with a linewidth that is much smaller than 0.1 $cm^{-1}$ and a tuning range that is greater than about 0.2 $cm^{-1}$. As it turns out, these characteristics can be found in readily available lasers in the near-infrared region of the spectrum where carbon dioxide has strong absorption lines that are well isolated from absorption lines from other gas species ambient air. For example, Distributed Feed Back (DFB) semiconductor diode lasers are commonly available devices, first developed for telecommunications applications but adapted for spectroscopic use. These devices have a linewidth that is less than 0.001 $cm^{-1}$, and are tunable quickly via drive current (over about 1 $cm^{-1}$) or more slowly via chip temperature (over about 15 $cm^{-1}$). As a result, there are numerous commercial CEAS gas analyzers on the market based on DFB lasers, to measure a variety of compounds such as carbon dioxide, water vapor, methane, nitrous oxide, ammonia, hydrogen sulfide, and many others.

For more complex compounds with more atoms, like benzene (which has 6 carbon and 6 hydrogen atoms), the number and density of individual ro-vibrational transitions increases to the point that the separation between adjacent absorption lines is smaller than the width of individual lines under typical sample conditions (temperature and pressure). In these instances, the extent of the spectral feature is determined not by the individual absorption line widths (which are no longer directly observable in the spectrometer), but by the broader features of the vibrational bands. Typical spectral extents of these bands is commonly 5-100 $cm^{-1}$, which is a factor of 50-1000 times greater than for isolated lines.

This presents an immediate challenge for CEAS instrument design, because the options are more limited for lasers capable of such broad tuning but that retain the narrow linewidth requirement that is driven by the simpler compounds (like carbon dioxide) present in the sample. These lasers tend to fall into two categories based on the type of tuning they exhibit: continuously tunable lasers, and piecewise tunable lasers. In a continuously tunable laser, the laser wavelength can be smoothly varied over the spectral range dictated by the application, which means that the laser power and wavelength varies smoothly without discontinuities (typically called "mode hops") in response to one or more control signals (e.g., a voltage or current) applied to one or more tuning actuators (e.g., a semiconductor chip current or a mechanical grating actuator). The response curve relating the actuator to the lasing wavelength need not be linear, but it must be a continuous function, such that practical mode-hop free tuning can be achieved.

In contrast, in a piecewise tunable laser, the laser exhibits two or more tuning regions in the full scanning range. In each tuning region, the laser wavelength can be smoothly varied by the application of a smooth set of actuator signals. However, to tune from a tuning region to another, there is no continuous combination of actuator signals that can achieve continuous tuning. Thus, a mode hop occurs in these instances, leading to discontinuities in laser power and wavelength.

In many CEAS implementations, all other things being equal, a continuously tunable laser would be a preferable solution. In fact, certain CEAS techniques, like ICOS, strongly prefer continuous tuning; the circulating optical power in the cavity must be in equilibrium (or quasi-equilibrium, subject to the wavelength tuning rate) for the resulting spectrum to be of high quality. A mode hop, which disrupts both the excitation wavelength and the circulating optical power, disrupts that equilibrium and distorts the resulting spectrum. Another significant advantage of continuous tuning is that the tuning actuator signal (or signals) can be used as a proxy for the wavelength axis, serving as important step in the wavelength determination that is a key element in a CEAS instrument. In other words, because the wavelength is a monotonic function of the tuning actuator, the tuning actuator value can be used to order adjacent wavelengths. It is a further advantage that if the tuning actuator is sufficiently stable over a period of time corresponding to a multiple of the individual spectral scan time, multiple spectra can be averaged prior to spectral analysis, which reduces the requirement for spectral analysis computing power dramatically, and can permit more advanced fitting methodologies with better performance.

However, continuously tunable lasers that can cover the wide ranges necessary for complex compound analysis often come with significant disadvantages: slow tuning speeds, poor wavelength targeting, large form factor, poor reliability, or high cost, among others. In contrast, there exist piecewise tunable lasers that do not exhibit these disadvantages. One example of such a device is a Sampled Grating Distributed Bragg Reflector (SG-DBR) semiconductor laser. The wavelength selectivity is obtained via the Vernier effect between two periodically varying reflectors with differing pitch. Tuning the laser involves the adjustment of current in these two reflectors (which shifts the wavelength response of the periodic reflectors). In addition, a third current is applied to adjust the round trip phase length of the cavity. The full tuning range of the laser (up to 200 $cm^{-1}$ or more) is broken up into several (generally overlapping) tuning regions that are typically no wider than about 3-5 $cm^{-1}$. Within each tuning region, continuous tuning is achieved by applying current to the two reflectors and the phase section according to a set of specific predetermined parametric expressions. Each tuning region has a different set of expressions.

In short, these piecewise tuning lasers exhibit the spectral linewidth, tuning range, and tuning agility necessary to incorporate them into CEAS instrumentation. The remaining element needed is wavelength determination at a level of 0.0001-0.004 $cm^{-1}$, as discussed above. One straightforward approach is to incorporate an absolute wavelength monitor capable of uniquely determining the center wavelength of the piecewise tunable laser with the requisite precision. However, these devices often have significant disadvantages that present challenges to incorporating them into CEAS instrument design: high cost, large footprint, and slow readout rate being among these. It would therefore be a significant advance in the state of the art if one could design a CEAS gas analysis instrument that employed a piecewise tunable laser without the need for absolute wavelength metrology.

SUMMARY

We provide improved CEAS using a piecewise tunable laser by using a lookup table for laser tuning that is configured specifically for this application. In preferred embodiments this is done in combination with a laser control strategy that provides precise wavelength determination using cavity modes of the instrument as a reference.

DETAILED DESCRIPTION

Section A describes general principles relating to embodiments of the invention. Section B relates to further design considerations. Section C provides a design example.

A) General Principles

Figure 1:
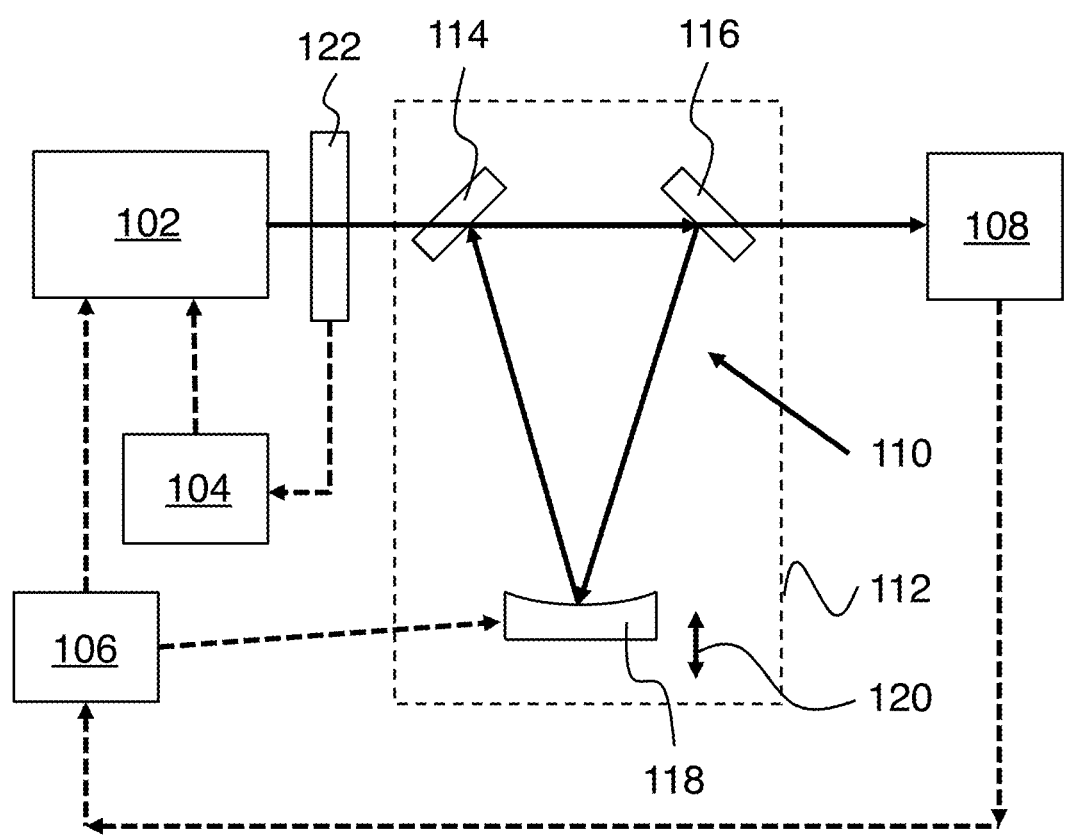
FIG. 1 shows an exemplary embodiment of the invention.

FIG. 1 shows an exemplary embodiment of the invention. The apparatus of this example includes an optical source 102 having a tunable emission wavelength. Here the optical source has two or more tuning inputs, and tuning of the optical source is piecewise continuous with respect to variation of any one of its tuning inputs, e.g., as in the examples described above. Here, control connections are show in dashed lines to better distinguish them from optical beam paths.

This example also includes an optical cavity 110 configured to accept an optical input from optical source 102 as shown. Optical cavity 110 has two or more mirrors (e.g., mirrors 114, 116, and 118 forming a ring resonator) and is also configured to accept a sample gas such that light circulating in the optical cavity passes through the sample gas. Here 112 schematically indicates that cavity 110 is part of a gas sample flow cell. Detector 108 receives ring-down signals from cavity 110.

The apparatus of FIG. 1 further includes a ring down controller 106 configured to monitor the light circulating in the optical cavity and configured to couple and interrupt coupling of light between the optical source and the optical cavity. Ringdown controller 106 can initiate ring-downs by altering the cavity length (schematically shown with arrows 120) or by making fine adjustment to the output wavelength of source 102. As indicated below, it is preferred for ringdown controller 106 to not alter the cavity length, and instead to perform its functions by fine tuning the source wavelength.

An important aspect of the apparatus of FIG. 1 is the inclusion of a tuning controller 104. Tuning controller 104 is configured to tune the optical source in a setpoint mode and in a control mode. The control mode is closed-loop control of a single control input of the optical source to tune output wavelength of the optical source. The setpoint mode is an open-loop tuning of the optical source using all tuning inputs according to a lookup table configured to maximize mode-hop free wavelength range around each output wavelength when using the control mode. Preferably, as described in greater detail below, the control mode makes use of a wavelength measurement subsystem 122. Wavelength measurement subsystem 122 preferably provides sufficient resolution to distinguish adjacent modes of optical cavity 110.

Figure 2:
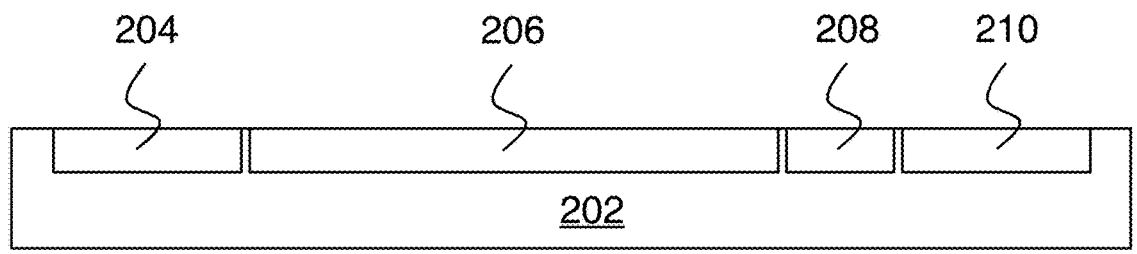
FIG. 2 shows a schematic sampled-grating DBR laser structure.

To better appreciate the two modes of tuning controller 104, it is helpful to consider tuning of an exemplary piecewise tunable semiconductor laser in more detail. FIG. 2 schematically shows a sampled-grating DBR laser. Here 202 is the device substrate, 204 and 210 are the first and second mirrors (M1 and M2), 206 is the main gain section of the laser, and 208 is a phase control section.

Figure 3:
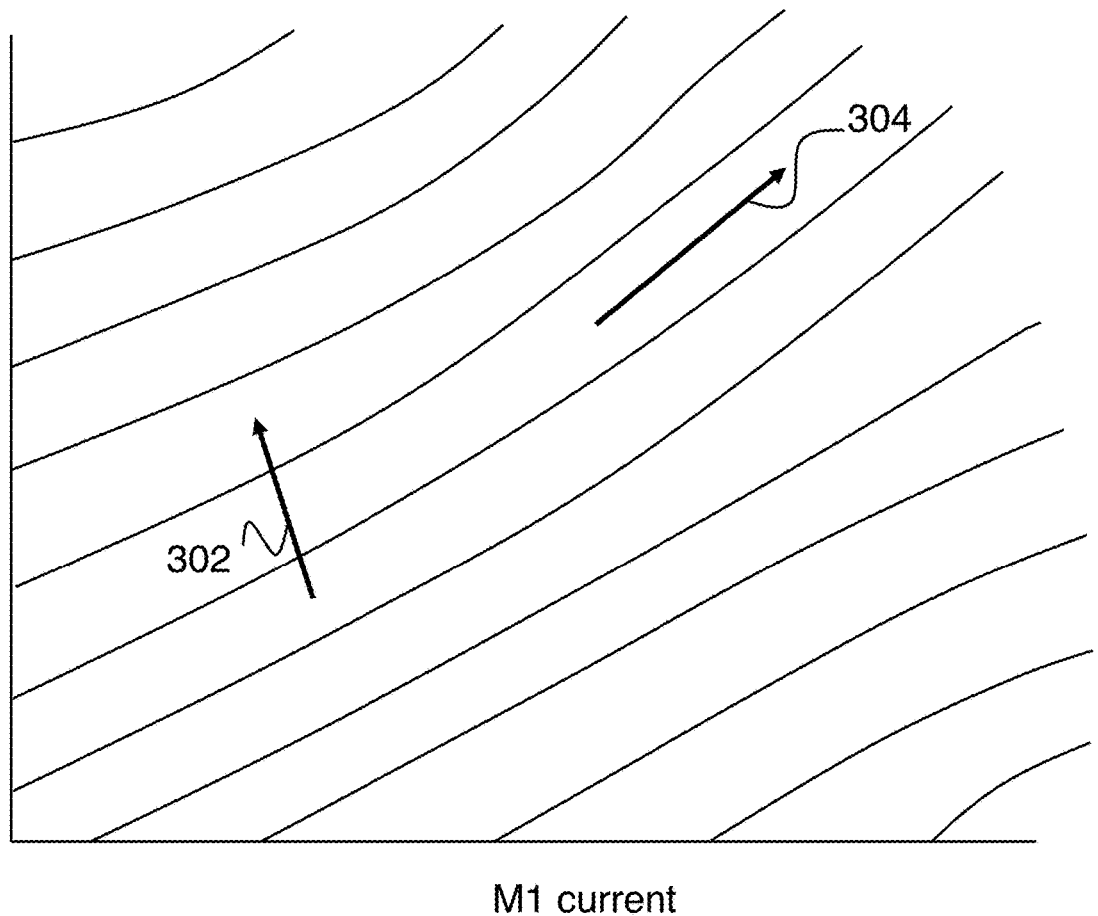
FIG. 3 schematically shows tuning of a sampled-grating DBR laser using the two mirror currents.

FIG. 3 is a simplified and schematic sketch of the tuning behavior of this device for fixed phase and gain currents. The lines on this plot show where mode hops occur, so that tuning path 302 has two mode hops in it, while tuning path 304 doesn't have a mode hop. Addition of a third tuning input (i.e., phase 208) would create a 3-D structure of continuous tuning regions separated by mode-hop boundaries. In some cases the gain current can also be used as a tuning parameter, and in such cases the tuning parameter space becomes 4-dimensional and consequently more difficult to visualize.

At this point, it is important to note that the tuning of sampled grating distributed Bragg reflector lasers is significantly application-dependent. For telecom applications, the need is merely to have a tuning calibration that will permit discrete tuning to any of the standard ITU wavelengths. In optical coherence tomography (OCT), the need is to perform long continuous wavelength scans (typically over the whole tuning range of the laser), so the required tuning strategy there is to piece together a continuous wavelength sweep, roughly by managing the mode hops so they cause discontinuities in tuning parameters rather than in the output wavelength. For CRDS, neither of these tuning approaches is appropriate. Instead, what is needed is the ability to tune to any specified wavelength target (with some uncertainty) and then to be able to fine-tune the laser wavelength around that point within a specified range (e.g., +/−0.3 nm) without encountering any mode hop. This is to enable closed-loop control of the laser wavelength within this range without having the control loop being disrupted by a mode hop. This is the significance of the setpoint mode of tuning controller 104 as described above. Another way of seeing this point is that a lookup table for an SG-DBR laser for either telecom or OCT applications would not work for this CRDS application.

In cases where optical source 102 is a sampled grating distributed Bragg reflector semiconductor laser, the tuning inputs typically include two mirror currents and a phase current. The tuning inputs can further include a gain current. In either case, the single control input for the control mode of tuning controller 104 is preferably the phase current.

To better appreciate the control mode of tuning controller 104, it is helpful to first consider a preferred form of wavelength/frequency measurement for a CRDS system having a widely tunable source.

Figure 4:
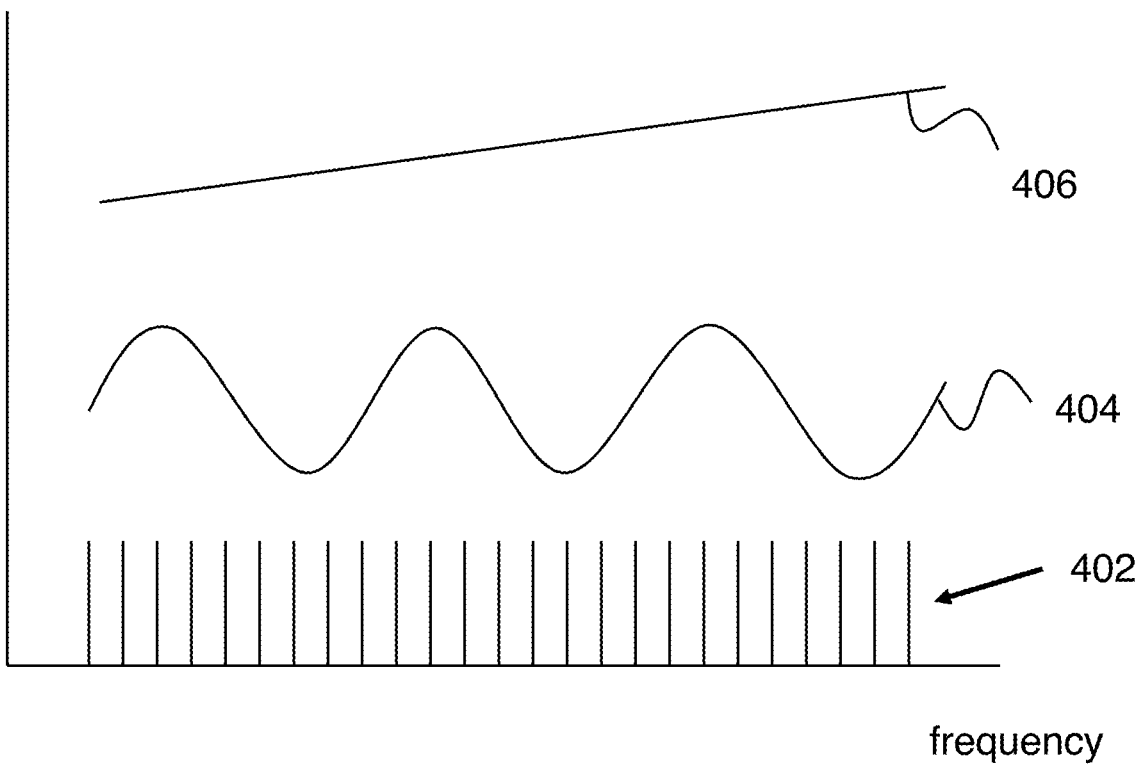
FIG. 4 schematically shows hierarchical wavelength determination for CRDS.

FIG. 4 schematically shows what we refer to as a hierarchical wavelength determination. The base of this hierarchy is the frequency comb 402 formed by the modes of optical cavity 110, spaced by the cavity free spectral range ($FSR_{cav}$). The top of this hierarchy is the tuning inputs to source 102, schematically shown as a single line 406, even though the tuning is multi-dimensional. What we'd like to be able to do is use the laser tuning inputs to determine which tooth of the frequency comb 402 each ring-down event occurs at (relative to a specified reference tooth), thereby providing a high-precision relative wavelength determination of each ring-down event. In practice, laser tuning inputs usually do not provide the resolution required to do this. Therefore, one or more intermediate stages in the hierarchy are provided, as schematically indicated by 404 on FIG. 4. This schematically shows the response of wavelength measurement subsystem 122 on FIG. 1, which could be an etalon having a periodic response as shown. Here a single intermediate hierarchy stage will suffice if response 404 provides enough resolution to resolve adjacent cavity modes in frequency comb 402, and if the laser tuning inputs 406 provide enough resolution to resolve adjacent peaks in response 404.

Figure 5:
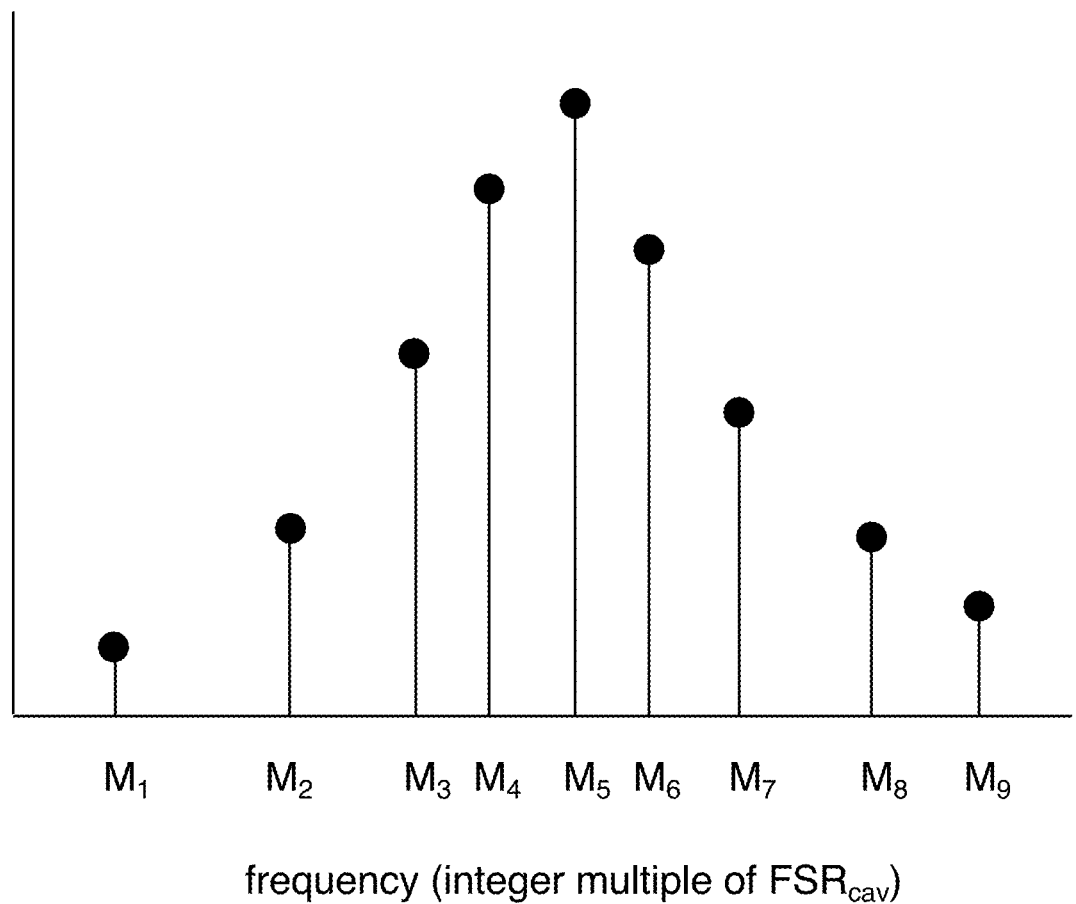
FIG. 5 schematically shows a CRDS frequency scale referenced to cavity free spectral range.

When these conditions are met, the cavity mode at which each ring-down event occurs can be assigned by using the laser tuning inputs to determine which peak of response 404 the event is at, followed by using response 404 to determine the cavity mode. The result is as shown on FIG. 5, where the horizontal axis for frequency is expressed as integer multiples of $FSR_{cav}$, e.g., $M_1, M_2, \ldots, M_9$ as shown. Note that the frequency FSR multiples in FIG. 5 need not be sequential integers—the frequency assignment hierarchy allows the assignment of non-sequential FSR multiples. This relative assignment of frequencies can be made absolute by measuring a known spectral reference feature.

Accordingly, the tuning controller is preferably configured to perform the following steps in sequence for each target wavelength of the optical source:
1) setting the output wavelength of the optical source to within +/−0.3 nm of the target wavelength using the setpoint mode;
2) waiting for a first settling time of 2 ms or less to let the optical source reach a steady state; and
3) activating the control mode to lock the output wavelength of the optical source to the target wavelength, where an error signal for the closed-loop control is provided by a wavelength measurement subsystem.

The tuning controller is preferably configured to perform the following further step:
waiting for a second settling time while the output wavelength of the optical source is within a control range of the target wavelength, where the second settling time is between 10 μs and 10 ms and where the control range is half a free spectral range of the optical cavity ($FSR_{cav}$) or less. This ensures that the tooth of the comb is known before initiating a ringdown event.

The ringdown controller is preferably configured to, after the second settling time, initiate a ring-down event by bringing the output wavelength of the optical source into resonance with the optical cavity by fine-tuning the output wavelength of the optical source. In principle, ring-downs can also be initiated be altering the cavity length, but that option is not preferred here since it would interfere with the hierarchical frequency scheme of FIG. 4.

The apparatus is preferably configured to provide a high-precision relative wavelength measurement for each ring-down event based on values of the tuning inputs of the optical source and based on measurements from the wavelength measurement subsystem. The high-precision relative wavelength measurement for each ring-down event can be an assignment of a multiple of $FSR_{cav}$ as the wavelength for each ring-down event (e.g., $M_1, M_2, \ldots, M_9$ on FIG. 5). As indicated above, the high-precision relative wavelength measurement can be made absolute by comparison with a spectral absorption standard.

More explicitly, it is the integer differences $M_2-M_1$, $M_3-M_1$, $M_4-M_1$ etc. that are known. The resulting relative frequency accuracy/precision is given by the cavity free spectral range, which is usually known both accurately and precisely. Assignment of an absolute frequency to the reference tooth (here $M_1$) can be done with low precision using the laser tuning inputs or with high precision by comparing the $M_1$-referenced frequency comb to a spectral standard. Naturally, any other tooth of the comb can also be used as the reference tooth.

B) Design Considerations

In the following we consider the incorporation of a piecewise tunable laser into a CEAS instrument. Tuning this type of laser features periods of continuous tuning interrupted by mode-hops. We denote this type of CEAS implementation as "event driven," in the sense spectral information (absorbance vs wavelength) is collected within each tuning region as part of at least one measurement events. This description is best understood in the context of examples.

We first consider an implementation of CRDS using a piecewise tunable laser. CRDS is inherently event-driven, where each event includes
a) tuning the laser to a specified wavelength,
b) shutting off the power to optical cavity (using the laser itself, or an additional optical switch),
c) recording the decay of the optical signal in the cavity, and
d) fitting an exponential (or related) function to the measured signal and converting that to a measurement of absorbance After this sequence is completed, the process is repeated at the same or a different wavelength point. For a CRDS implementation, the fact that the laser is tuned in a piecewise fashion is of no particular consequence—the cavity photodetector signal obtained during wavelength tuning is not used in the subsequent analysis of absorbance. The full spectrum is assembled from multiple ring down events collected across the full spectral tuning range.

The CEAS instrument can include:
1) A piecewise tunable laser
2) An optical cavity including two or more highly reflecting mirrors containing the gas to be measured
3) A means of interrupting the optical power to the optical cavity quickly (i.e., faster than the ringdown time of the optical cavity)
4) A means of monitoring the circulating optical power in the cavity (e.g., a photodetector situated to measure the transmitted beam from one of the cavity mirrors other than the input mirror) that is used to record the decay of the circulating optical power after the input power is interrupted.
5) A hierarchical system of two or more wavelength measurements; where at least one wavelength measurement is a relative wavelength measurement that provides the requisite wavelength precision but does not provide an unambiguous wavelength identification; and where at least one measurement is an absolute wavelength measurement that provides an unambiguous wavelength identification but does not provide the requisite wavelength precision.
6) Examples of relative wavelength measurements include:
6a) The reflection of an etalon that varies sinusoidally with excitation wavelength. For an excitation wavelength that corresponds to the zero-crossing of the sinusoid, small changes in wavelength leads to measurable changes in the measured reflectivity, but the absolute wavelength cannot be determined from the wavelength monitor signal alone, since the zero crossing condition can in principle be satisfied by numerous excitation wavelengths within the spectral range of the laser, separated from each other by the free spectral range (FSR) of the etalon.
6b) Two etalons shifted in phase relative to each other can be used in combination, to remove the ambiguity that occurs at the extrema of the reflection signal of either etalon.
6c) Any interferometry based optical system that produces a periodic signal or set of signals as a function of wavelength. The two examples above fall into this category.
6d) The FSR of the optical cavity itself, if the cavity has a clearly defined mode structure. Note that in this case, the relative wavelength measurement consists simply of the observation that a ring down occurred, which itself implies that the center wavelength of the excitation must have been at a multiple of the cavity FSR, within the very narrow bandwidth of the cavity.

7) Examples of absolute wavelength measurements include:
7a) The set of laser tuning actuator signals
7b) A coarse wavelength measurement device, based for example on a grating or any slowly varying wavelength signal (e.g., specially designed coatings)
7c) The baseline loss of the optical cavity itself
7d) The absorption features of one or more compounds either 1) present in the gas sample being measured, or 2) present in an auxiliary gas cell C) Design Example We explore the following example of a hierarchical wavelength measurement in a CRDS instrument. In this example, we consider a CRDS cavity with a well-defined longitudinal mode structure, and therefore with a clearly defined grid of allowed modes in the cavity, separated in frequency by the FSR of the cavity. This example includes the following features:
1) The FSR of the high finesse optical cavity establishes the relative wavelength with an extremely high degree of precision,
2) A second etalon system with sufficient relative wavelength resolution to clearly distinguish adjacent cavity modes (separated by the FSR of the cavity), but with a substantially larger FSR than the cavity,
3) Coarse wavelength determination via the set of tunable laser actuator values, which itself can distinguish between adjacent FSRs of the etalon, but does not have sufficient precision to distinguish adjacent cavity FSRs,
4) Measurement of the center frequency of carbon dioxide or other common compound in the air using a specified absorption line or set of lines The combination of these four measurements provides exceptional wavelength precision given by the mode structure of the optical cavity, but that is tied ultimately to the absorption line of a specific compound, which is an intrinsic property of the compound and provides a very accurate absolute frequency reference.

A calibration and control strategy for the piecewise tunable laser is needed. There are several important considerations in designing this strategy:
1) In many piecewise tunable lasers with multiple tuning actuators, it is common to find that multiple combinations of tuning actuator settings can produce the same output wavelength. For example, in the SG-DBR laser described above, the ensemble of currents delivered to the two reflectors and the phase section needed to produce a given wavelength trace out a surface in the three-dimensional tuning actuator space. If the gain current is included as a tuning actuator, the ensemble of actuator values is a three-dimensional volume in the four-dimensional space of possible actuator values. Thus, in designing the calibration and control strategy, one must provide a means of selecting which combination of tuning actuator settings will be used to generate a specific wavelength. Note that the combination of tuning actuator settings used to generate the same wavelength may be different in different contexts, as will be discussed below.
2) Controlling a piecewise tunable laser requires complex electronics with mixed analog and digital signals. Fast tuning requires rapid changes in the control currents; stable wavelength and narrow linewidth requires low noise current sources; piecewise tuning implies a complex laser calibration that requires flexible and fast digital control electronics. These design requirements are not easy to achieve simultaneously—for the sake of cost, robustness, manufacturability, and development time, it is necessary to simplify the control system where possible.
3) Precision spectroscopy requires the ability to target specific frequencies. It is therefore important to incorporate the various signals of the wavelength measurement hierarchy into the control system. In other words, the laser calibration and control system preferably reflects the strengths and limitations of the wavelength measurement hierarchy.

Given these considerations, an exemplary system for laser calibration, control, and CRDS data acquisition is as follows:

Two laser tuning methods are defined: Laser Setpoint and Laser Tuning. Here Laser Setpoint is an open-loop, wideband tuning method that that uses a calibration table to set all three tuning actuators in the SG-DBR, to access any wavelength in the tuning range. As noted above, there are many combinations of tuning actuator values that could produce the same wavelength. The specific combination in the calibration table could be selected to optimize a number of different parameters (power, linewidth, etc.). In this case, we have selected the combination that gives the broadest mode-hop free tuning range using the fast tuning method defined below. This was chosen to allows us the greatest "capture range" defined as the amount that the fast tuning actuator needs to move to achieve the final wavelength target.

The Laser Tuning method is a closed-loop, narrowband tuning method that uses a single actuator, or a predefined combination of actuators. In the case of the SG-DBR, we have selected an actuator that adjusts the fine phase current over a fraction of its total range (around the phase setpoint selected in the slow open-loop tuning method). This satisfies several design goals at the same time: it simplifies the fast closed loop tuning method to a single actuator; it decreases the likelihood of mode hops as the laser and/or electronics drift over life; and it minimizes the wavelength noise by minimizing the contribution of the fast (and thus noisier) current source to the overall wavelength noise.

In operation, a sequence of target wavelengths is defined. This sequence of target wavelengths is preferably selected to optimize the precision and selectivity of detection for a given set of target analytes and background gas species.

For each target wavelength, the following process is executed:
1) The laser setpoint loop is used to set the laser to the target wavelength.
2) A short time delay (<2000 µs) is provided to allow the laser to settle at the nominal wavelength given by the actuator settings.
3) A feedback loop is activated to lock the relative wavelength to a target value, using the laser tuning method as the control and the relative wavelength measurement device as the error signal.
4) Once the laser is within a tolerance value of the target value for a specified amount of time (e.g., 10 µs-10 ms), the system searches for the resonance condition between the laser and the optical cavity. This may be achieved either by adjusting the cavity length a small amount, or preferably by adjusting the laser frequency a small amount, until the effective optical path length in the cavity equals an integer multiple of the wavelength.

5) When this condition is achieved, optical power builds up in the cavity. When the light on the photodetector reaches a predetermined threshold, the input optical power to the cavity is interrupted. The photodetector signal records the ring down decay of the cavity. In the simplest CRDS implementation, this decay signal is fit to an exponential function. The time constant of this decay is converted to an effective absorbance, of which the absorbance of the gas is one component.

6) The wavelength corresponding to this point is assigned via the following process:

6a) Because we know that a ringdown occurred, we can be sure that the optical frequency is one of many possible frequencies, separated from each other by the known cavity FSR (e.g., 0.02 cm-1). Because we know the FSR with a high degree of precision, we can assign the wavelength uncertainty as better than $1\times10^{-4}$ cm$^{-1}$, modulo the FSR of the cavity.

6b) We know which tooth of the FSR comb the event occurred on from the etalon based relative wavelength measurement, modulo the FSR of the etalon system (e.g., 1.5 cm$^{-1}$).

6c) We know which oscillation of the etalon system the event occurred on based on the piecewise tunable laser actuator values.

The measured ring downs and the assigned wavelengths are assembled into a spectrogram, upon which we can apply more spectroscopic analysis techniques to determine the concentrations of target analytes that are present in the sample.

From this spectrogram, we can perform a final small tweak of the cavity FSR based upon comparison of the measured line center of one or more absorption lines in the gas sample to a library value.

Although the preceding examples relate to CRDS, it is expected that similar tuning strategies can be relevant for other CEAS techniques, such as ICOS. For example, we may employ the following algorithm to collect a single ICOS measurement event:

1) tuning the laser to a specified wavelength at or near one extreme of a given piecewise tuning region 2) scanning the laser across the tuning region, recording the photodetector signal. The initial transient at the start of this sub-scan, when the cavity power is not in equilibrium, is discarded.

In this implementation, each measurement event includes a sub-spectrum collected over the individual tuning region. Subsequent events could be in the same tuning region, or a different tuning region. The complete spectrum can be assembled from multiple individual measurement events.

At the end of the tuning region, the laser may be turned off, which allows one to collect a single ringdown event, which allows for further refinement of spectral data obtained from the ICOS signal.

The invention claimed is:

1. Apparatus for performing cavity ring down spectroscopy, the apparatus comprising:

an optical source having a tunable emission wavelength, wherein the optical source has two or more tuning inputs, and wherein tuning of the optical source is piecewise continuous with respect to variation of any one of its tuning inputs;

an optical cavity having two or more mirrors and configured to accept an optical input from the optical source, wherein the optical cavity is also configured to accept a sample gas such that light circulating in the optical cavity passes through the sample gas;

a ringdown controller configured to monitor the light circulating in the optical cavity and configured to couple and interrupt coupling of light between the optical source and the optical cavity;

a tuning controller configured to tune the optical source in a setpoint mode and in a control mode;

wherein the control mode is closed-loop control of a single control input of the optical source to tune output wavelength of the optical source;

wherein the setpoint mode is an open-loop tuning of the optical source using all tuning inputs according to a lookup table configured to maximize a nonzero modehop free wavelength range around each output wavelength when using the control mode;

wherein the optical source is a sampled grating distributed Bragg reflector semiconductor laser.

2. The apparatus of claim 1, wherein the tuning inputs of the optical source include two mirror currents and a phase current.

3. The apparatus of claim 2, wherein the tuning inputs of the optical source further include a gain current.

4. The apparatus of claim 2, wherein the control input of the optical source is the phase current.

5. The apparatus of claim 1, wherein the nonzero modehop free wavelength range around each output wavelength is at least +/−0.3 nm.

* * * * *